(12) United States Patent
Chuang et al.

(10) Patent No.: US 8,139,065 B2
(45) Date of Patent: *Mar. 20, 2012

(54) MACHINE-IMPLEMENTED METHOD AND ELECTRONIC DEVICE FOR PRESENTING A DUAL-AXIS GRAPH

(75) Inventors: Chang-Shan Chuang, Taipei (TW); Hao-Yuan Chuang, Taipei (TW)

(73) Assignee: Chii Ying Co., Ltd., Taipei (TW)

( * ) Notice: Subject to any disclaimer, the term of this patent is extended or adjusted under 35 U.S.C. 154(b) by 639 days.

This patent is subject to a terminal disclaimer.

(21) Appl. No.: 12/220,604

(22) Filed: Jul. 24, 2008

(65) Prior Publication Data

US 2009/0027394 A1    Jan. 29, 2009

(30) Foreign Application Priority Data

Jul. 26, 2007 (TW) ............................. 96127365 A
May 28, 2008 (TW) ............................. 97119668 A

(51) Int. Cl.
*G06T 11/20* (2006.01)
*G09G 5/22* (2006.01)
(52) U.S. Cl. .................. 345/440; 345/440.1; 345/440.2
(58) Field of Classification Search .................. 345/440, 345/440.1, 440.2
See application file for complete search history.

(56) References Cited

U.S. PATENT DOCUMENTS

| 5,485,564 | A  | * | 1/1996  | Miura ............................ 345/440 |
| 6,271,693 | B1 | * | 8/2001  | Shi et al. ......................... 327/99 |
| 6,603,477 | B1 | * | 8/2003  | Tittle ............................. 345/440 |
| 2003/0165924 | A1 | * | 9/2003 | Shiffman et al. ................. 435/6 |
| 2005/0248588 | A1 | * | 11/2005 | Freeman et al. .............. 345/660 |
| 2006/0038119 | A1 | * | 2/2006 | Guevremont et al. ......... 250/282 |
| 2006/0221078 | A1 | * | 10/2006 | Ishizuka ...................... 345/440 |
| 2007/0165238 | A1 | * | 7/2007 | Boyd ............................ 356/478 |

* cited by examiner

*Primary Examiner* — Jeffrey Chow
(74) *Attorney, Agent, or Firm* — Ladas & Parry, LLP

(57) ABSTRACT

A machine-implemented method for presenting a dual-axis graph for a pair of data sets includes: reading the data sets; setting first and second boundaries of a first reference axis using first coordinates of data points of one data set having maximum and minimum values, respectively; setting first and second boundaries of a second reference axis by adjusting either the first coordinate of one data point of the other data set having a maximum value or the first coordinate of one data point of the other data set having a minimum value, wherein an E-value calculated based on thus-obtained final first and second boundaries of the second reference axis is substantially equal to an E-value of the first data set; and plotting the data points of the data sets. An electronic device capable of presenting a dual-axis graph is also disclosed.

20 Claims, 7 Drawing Sheets

Table 1

| Year | 1980 | 1981 | 1982 | 1983 | 1984 | 1985 | 1986 | 1987 | 1988 |
|---|---|---|---|---|---|---|---|---|---|
| Average Educational Expenditures (in thousands of US dollars) | 3.51 | 3.52 | 3.66 | 3.8 | 3.9 | 4 | 4.3 | 4.4 | 4.5 |
| Average SAT Score | 845 | 852 | 854 | 845 | 850 | 861 | 890 | 903 | 904 |

Table 2

| | 2005. | 2005. | 2005. | 2006. | 2006. | 2006. | 2006. | 2007. | 2007. | 2007. | 2007. | 2008. |
|---|---|---|---|---|---|---|---|---|---|---|---|---|
| | 6.30 | 9.30 | 12.31 | 3.31 | 6.30 | 9.30 | 12.31 | 3.31 | 6.30 | 9.30 | 12.31 | 3.31 |
| Revenue | 36000 | 36750 | 36800 | 37500 | 38750 | 39000 | 39500 | 41000 | 42750 | 43500 | 44000 | 47620 |
| Net income | -842 | -852 | -855 | -856 | -847 | -848 | -850 | -861 | -880 | -900 | -901 | -904 |

FIG. 10

MACHINE-IMPLEMENTED METHOD AND ELECTRONIC DEVICE FOR PRESENTING A DUAL-AXIS GRAPH

CROSS-REFERENCE TO RELATED APPLICATION

This application claims priority of Taiwanese Application Nos. 096127365 and 097119668, filed on Jul. 26, 2007 and May 28, 2008, respectively.

BACKGROUND OF THE INVENTION

1. Field of the Invention

The invention relates to a machine-implemented method and an electronic device for presenting a dual-axis graph for a pair of data sets, in which adjustments are made to boundaries of one of two reference axes in a manner allowing for optimal comparison between the data sets.

2. Description of the Related Art

It is often desirable to present a pair of data sets on a single graph. Microsoft Office EXCEL® may be used for such a purpose. The graph of FIG. 1 is presented using Microsoft Office EXCEL®, and shows average educational expenditures for each child in the United States (in thousands of US dollars) and average SAT (Scholastic Aptitude Test) scores in the United States from 1980 to 1988. Due to the significant difference in scale between the two data sets, however, no meaningful comparison therebetween is possible using the graph of FIG. 1.

Other conventional graphing tools are available. However, all conventional graphing tools are deficient with respect to the manner in which boundaries of the two reference axes are selected. For example, assuming that the two reference axes are y-axes, if the boundaries of the left y-axis are set to be equal to the maximum and minimum values of one of the data sets, and the boundaries of the right y-axis are set to be equal to the maximum and minimum values of the other data set, although the fluctuations in the resulting curves for the two data sets are clearly visible, completely erroneous conclusions may be drawn from the resulting graph since such an approach of setting the boundaries of the two axes is arbitrary. That is, with such an approach, the boundaries are set for the two axes without taking into consideration any relation between the two data sets, leading to curves that may suggest correlations between the data sets where there are none or correlations which may be inaccurate.

SUMMARY OF THE INVENTION

Therefore, an object of this invention is to provide a machine-implemented method and an electronic device for presenting a dual-axis graph for a pair of data sets, in which adjustments are made to boundaries of one of two reference axes in a manner allowing for optimal comparison between the data sets.

According to one aspect, the machine-implemented method of this invention for presenting a dual-axis graph for a pair of data sets, in which the dual-axis graph has a pair of independent and parallel first and second reference axes, and a shared axis intersecting the first and second reference axes, each of the data sets has a plurality of data points, and each of the data points includes a numerical first coordinate and a second coordinate, comprises: a) reading the pair of the data sets; b) for each of the data sets, calculating an E-value, the E-value being a scaled function of a range of values of the first coordinates of the data points; c) designating the data set with the larger E-value as a first data set, and the data set with the smaller E-value as a second data set; d) setting a first boundary of the first reference axis to be equal to the first coordinate of one of the data points of the first data set having a maximum value, and a second boundary of the first reference axis to be equal to the first coordinate of one of the data points of the first data set having a minimum value; e) setting first and second boundaries of the second reference axis by designating the first coordinate of one of the data points of the second data set having a maximum value and the first coordinate of one of the data points of the second data set having a minimum value as an initial first boundary and an initial second boundary of the second reference axis, respectively, and adjusting one of the initial first boundary and the initial second boundary of the second reference axis to thereby obtain final first and second boundaries of the second reference axis, wherein an E-value calculated based on the final first and second boundaries of the second reference axis is substantially equal to the E-value of the first data set; and f) plotting on a same coordinate plane the data points of the first data set with reference to the first reference axis and the shared axis, and the data points of the second data set with reference to the second reference axis and the shared axis.

According to another aspect, an electronic device of this invention capable of presenting a dual-axis graph for a pair of data sets, in which the dual-axis graph has a pair of independent and parallel first and second reference axes, and a shared axis intersecting the first and second reference axes, each of the data sets has a plurality of data points, and each of the data points includes a numerical first coordinate and a second coordinate, comprises: a user interface for allowing user input of an input instruction associated with the data sets; a reader coupled to the user interface to receive the input instruction, and reading the data sets in accordance with the input instruction; an E-value calculating module coupled to the reader, and which, for each of the data sets, calculates an E-value, the E-value being a scaled function of a range of values of the first coordinates of the data points; a boundary-setting module coupled to the E-value calculating module, the boundary-setting module designating the data set with the larger E-value as a first data set, and the data set with the smaller E-value as a second data set, setting a first boundary of the first reference axis to be equal to the first coordinate of one of the data points of the first data set having a maximum value, and a second boundary of the first reference axis to be equal to the first coordinate of one of the data points of the first data set having a minimum value, and setting first and second boundaries of the second reference axis by designating the first coordinate of one of the data points of the second data set having a maximum value and the first coordinate of one of the data points of the second data set having a minimum value as an initial first boundary and an initial second boundary of the second reference axis, respectively, and adjusting one of the initial first boundary and the initial second boundary of the second reference axis to thereby obtain final first and second boundaries of the second reference axis, wherein an E-value calculated based on the final first and second boundaries of the second reference axis is substantially equal to the E-value of the first data set; and a graph-presenting module coupled to the reader and the boundary-setting module, the graph-presenting module plotting on a same coordinate plane the data points of the first data set with reference to the first reference axis and the shared axis, and the data points of the second data set with reference to the second reference axis and the shared axis.

BRIEF DESCRIPTION OF THE DRAWINGS

Other features and advantages of the present invention will become apparent in the following detailed description of the preferred embodiment with reference to the accompanying drawings, of which:

FIG. 10 shows two tables of data points of the data sets used for the graphs of FIGS. 1, 5, 6, and 7.

DETAILED DESCRIPTION OF THE PREFERRED EMBODIMENT

Figure 2:
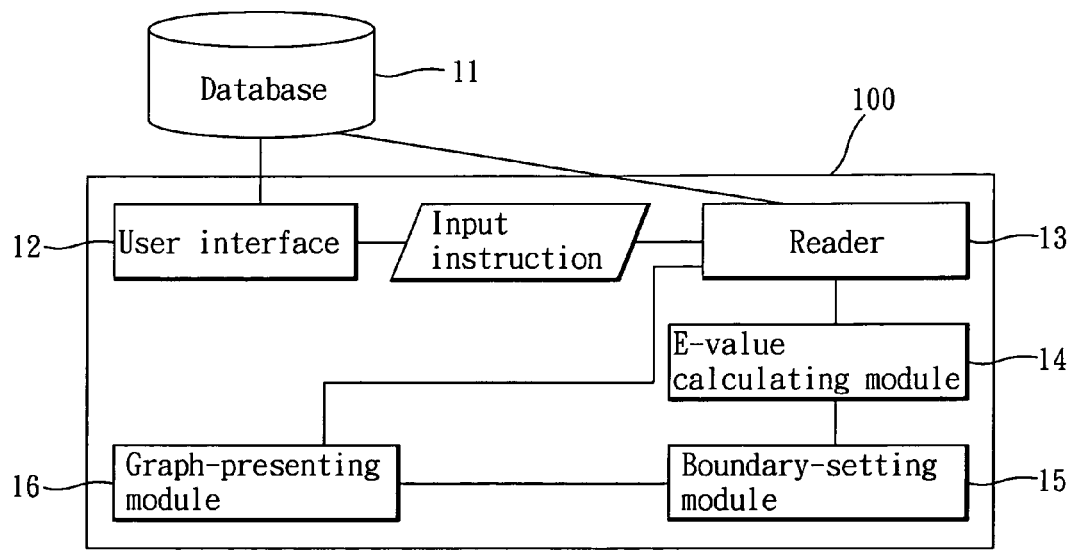
FIG. 2 is a block diagram of an electronic device that is capable of presenting a dual-axis graph for a pair of data sets according to a preferred embodiment of the present invention.

Referring to FIG. 2, an electronic device 100 capable of presenting a dual-axis graph for a pair of data sets according to a preferred embodiment of the present invention includes a user interface 12, a reader 13 coupled to the user interface 12, an E-value calculating module 14 coupled to the reader 13, a boundary-setting module 15 coupled to the E-value calculating module 14, and a graph-presenting module 16 coupled to the reader 13 and the boundary-setting module 15. The dual-axis graph has a pair of independent and parallel first and second reference axes, and a shared axis intersecting the first and second reference axes. By "independent," it is meant that the first and second axes have measurement units and boundaries that are different and unrelated.

Each of the data sets has a plurality of data points, and each of the data points includes a numerical first coordinate and a second coordinate. The electronic device 100 is exemplified as a computer in this embodiment, but may be a personal digital assistant, a smart phone, etc., in other embodiments of this invention.

Figure 3:
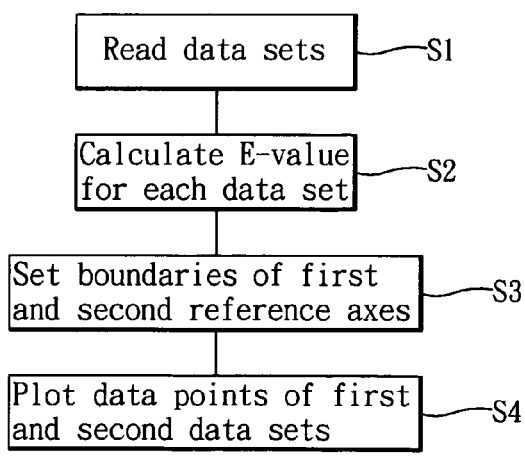
FIG. 3 is a flowchart of a machine-implemented method for presenting a dual-axis graph for a pair of data sets according to a preferred embodiment of the present invention.

The electronic device 100 of the present invention performs a method of presenting a dual-axis graph for a pair of data sets. A flowchart of a preferred embodiment of the method according to the present invention is shown in FIG. 3.

First, in step S1, the reader 13 reads the data sets in accordance with an input instruction. In one embodiment, the reader 13 is coupled to a database 11 that stores the data sets, the user interface 12 allows user input of the input instruction associated with the data sets, and the input instruction received from the user interface 12 causes the reader 13 to read the data sets in the database 11. In some embodiments, the database 11 may be a part of the electronic device 100, and in such embodiments, the user inputs the data sets into the database 11 through the user interface 12 any time prior to input of the input instruction. In other embodiments, the user inputs the data sets through the user interface 12 as part of the input instruction, and the reader 13 reads the data sets contained in the input instruction after receiving the input instructions.

Next, in step S2, the E-value calculating module 14 calculates an E-value for each of the data sets. For each of the data sets, the E-value is a scaled function of a range of values of the first coordinates of the data points.

In one embodiment, for each of the data sets, the E-value calculating module 14 calculates the E-value by subtracting the first coordinate of said one of the data points of the data set with the minimum value from the first coordinate of said one of the data points of the data set with the maximum value to thereby obtain a difference (i.e., the range of the values of the first coordinates of the data points of the data set), determining which of an absolute value of the first coordinate of said one of the data points of the data set with the minimum value and an absolute value of the first coordinate of said one of the data points of the data set with the maximum value is larger, setting the larger absolute value as a multiplier, and multiplying the difference by an inverse of the multiplier.

In another embodiment, for each of the data sets, the E-value calculating module 14 calculates the E-value by determining which of an absolute value of the first coordinate of said one of the data points of the data set with the minimum value and an absolute value of the first coordinate of said one of the data points of the data set with the maximum value is larger, setting the larger absolute value as a multiplier, and subtracting a product of the first coordinate of said one of the data points of the data set with the minimum value and an inverse of the multiplier from a product of the first coordinate of said one of the data points of the data set with the maximum value and the inverse of the multiplier.

In some embodiments, the multiplier is used to perform a division operation without first obtaining the inverse of the multiplier.

Subsequently, in step S3, the boundary-setting module 15 sets boundaries of the first and second reference axes. In particular, the boundary-setting module 15 first designates the data set with the larger E-value as a first data set, and the data set with the smaller E-value as a second data set. In the case where the E-values for the two data sets are equal, any one of the data sets is designated as the first data set, and the other of the two data sets is designated as the second data set. Next, the boundary-setting module 15 sets a first boundary of the first reference axis to be equal to the first coordinate of one of the data points of the first data set having a maximum value, and a second boundary of the first reference axis to be equal to the first coordinate of one of the data points of the first data set having a minimum value. Finally, the boundary-setting module 15 sets first and second boundaries of the second reference axis by designating the first coordinate of one of the data points of the second data set having a maximum value and the first coordinate of one of the data points of the second data set having a minimum value as an initial first boundary and an initial second boundary of the second reference axis, respectively, and adjusting one of the initial first boundary and the initial second boundary of the second reference axis to thereby obtain final first and second boundaries of the second reference axis. Such adjustment is performed by the boundary-setting module 15 in order that an E-value that is calculated based on the final first and second boundaries of the second reference axis is substantially equal to the E-value of the first data set.

Figure 4:
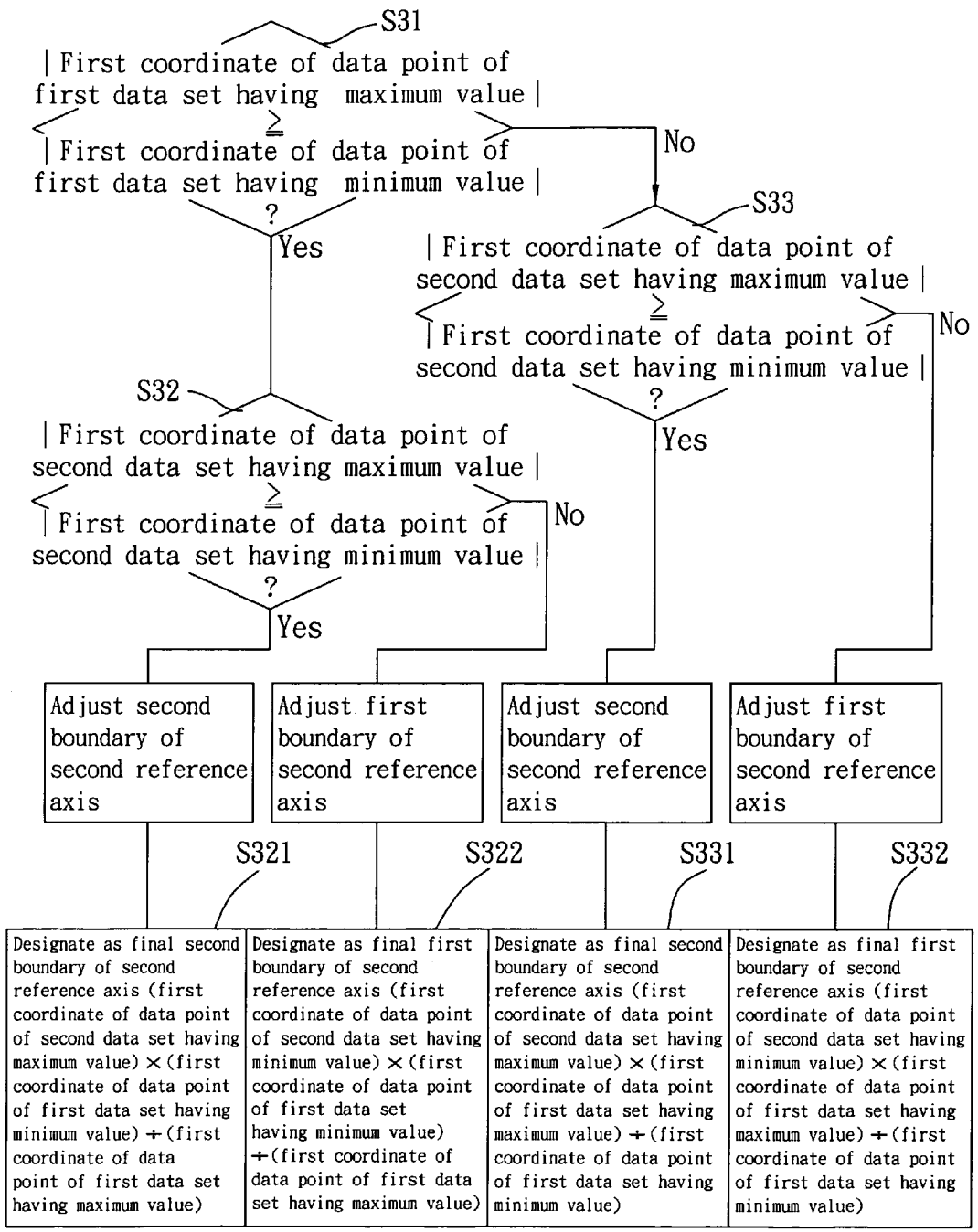
FIG. 4 is a flowchart of sub-steps involved in step S3 of FIG. 3.

FIG. 4 illustrates the sub-steps involved in obtaining the final first and second boundaries of the second reference axis of step S3.

First, in step S31, it is determined if an absolute value of the first coordinate of said one of the data points of the first data set having the maximum value is greater than or equal to an absolute value of the first coordinate of said one of the data points of the first data set having the minimum value. If so, step S32 is performed. Otherwise, step S33 is performed.

In step S32, it is determined if an absolute value of the first coordinate of said one of the data points of the second data set having the maximum value is greater than or equal to an absolute value of the first coordinate of said one of the data points of the second data set having the minimum value. If so, step S321 is performed. Otherwise, step S322 is performed.

In step S321, the first coordinate of said one of the data points of the second data set having the maximum value is designated as the final first boundary of the second reference axis, and a product of the first coordinate of said one of the data points of the second data set having the maximum value and a ratio value obtained by dividing the first coordinate of said one of the data points of the first data set having the minimum value by the first coordinate of said one of the data points of the first data set having the maximum value is designated as the final second boundary of the second reference axis.

In step S322, the first coordinate of said one of the data points of the second data set having the minimum value is designated as the final second boundary of the second reference axis, and a product of the first coordinate of said one of the data points of the second data set having the minimum value and a ratio value obtained by dividing the first coordinate of said one of the data points of the first data set having the minimum value by the first coordinate of said one of the data points of the first data set having the maximum value is designated as the final first boundary of the second reference axis.

In step S33, it is determined if the absolute value of the first coordinate of said one of the data points of the second data set having the maximum value is greater than or equal to the absolute value of the first coordinate of said one of the data points of the second data set having the minimum value. If so, step S331 is performed. Otherwise, step S332 is performed.

In step S331, the first coordinate of said one of the data points of the second data set having the maximum value is designated as the final first boundary of the second reference axis, and a product of the first coordinate of said one of the data points of the second data set having the maximum value and a ratio value obtained by dividing the first coordinate of said one of the data points of the first data set having the maximum value by the first coordinate of said one of the data points of the first data set having the minimum value is designated as the final second boundary of the second reference axis.

In step S332, the first coordinate of said one of the data points of the second data set having the minimum value is designated as the final second boundary of the second reference axis, and a product of the first coordinate of said one of the data points of the second data set having the minimum value and a ratio value obtained by dividing the first coordinate of said one of the data points of the first data set having the maximum value by the first coordinate of said one of the data points of the first data set having the minimum value is designated as the final first boundary of the second reference axis.

Referring back to FIG. 3, in step S4, the graph-presenting module 16 plots on a same coordinate plane the data points of the first data set with reference to the first reference axis and the shared axis, and the data points of the second data set with reference to the second reference axis and the shared axis. The graph-presenting module 16 is exemplified as a computer display in this embodiment but may be a computer printer in other embodiments of this invention.

In one embodiment, the graph-presenting module 16 plots the data points of at least one of the first and second data sets in a line graph. In another embodiment, the graph-presenting module 16 plots the data points of at least one of the first and second data sets in a bar chart. In such an embodiment where the graph presented by the electronic device 100 of the present invention is a bar chart, the first and second boundaries may be further adjusted by a predetermined amount so that when any first coordinates have small values, they are clearly visible in the resulting bar chart.

Specific examples of presenting a dual-axis graph using the electronic device 100 of the present invention will now be provided.

Referring first to FIG. 10, Table 1 shown therein lists average educational expenditures for each child in the United States (in thousands of US dollars) and average SAT (Scholastic Aptitude Test) scores in the United States from 1980 to 1988. When Microsoft Office EXCEL® is used to present a graph of these data sets, the graph of FIG. 1 results. The problems associated with such a graph have been discussed fully hereinabove.

Figure 5:
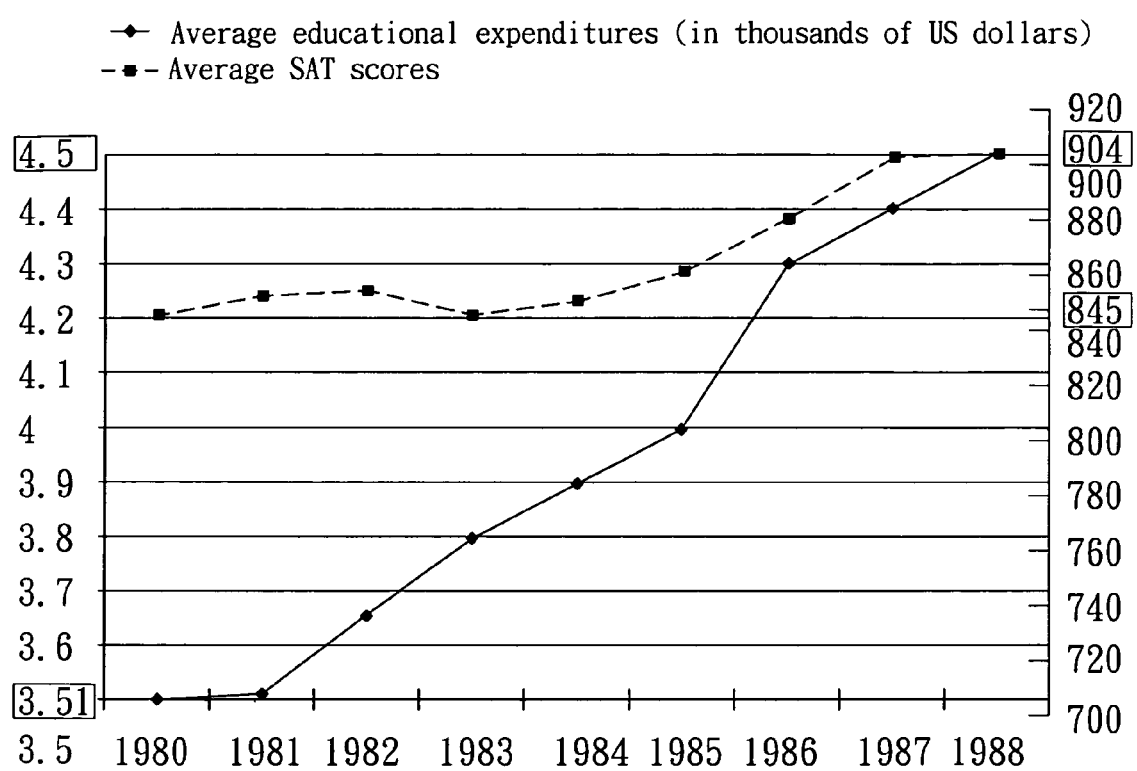
FIG. 5 is a graph similar to FIG. 1, but which is presented using the present invention.

When the same two data sets are presented in a dual-axis graph using the electronic device 100 of the present invention, the graph shown in FIG. 5 results. To present the graph, the E-value calculating module 14 first calculates an E-value for each of the data sets. This results in an E-value for the average educational expenditures of $(4.5-3.51)/4.5 \approx 0.22$, and an E-value for average SAT scores of $(904-845)/904 \approx 0.07$.

Since the E-value for the average educational expenditures is higher than the E-value for the average SAT scores, the data set of the average educational expenditures is designated as the first data set, and the data set of the average SAT scores is designated as the second data set.

Hence, the upper and lower (i.e., first and second) boundaries for the left y-axis are set to be equal to the maximum and minimum values, respectively, of the average educational expenditures. Moreover, referring additionally to FIG. 4, since an absolute value of the maximum value (i.e., 4.5) of the average educational expenditures is greater than an absolute value of the minimum value (i.e., 3.51) of the average educational expenditures, and since an absolute value of the maximum value (i.e., 904) of the average SAT scores is greater than an absolute value of the minimum value (i.e., 845) of the average SAT scores, the upper (or first) boundary for the right y-axis is set to be equal to the maximum value of the SAT scores, while the lower (or second) boundary for the right y-axis is adjusted using step S321. Namely, the lower boundary for the left y-axis is set to be equal to $904(3.51/4.5) \approx 705$.

Through such an adjustment, an E-value calculated based on the upper boundary of the right y-axis and the adjusted lower boundary thereof is substantially equal to the E-value for the average educational expenditures calculated above. That is, after the adjustment, the E-value calculated based on the upper and lower boundaries of the right y-axis, namely, $(904-705)/904 \approx 0.22$, is substantially equal to the E-value for the average educational expenditures as calculated above.

Figure 1:
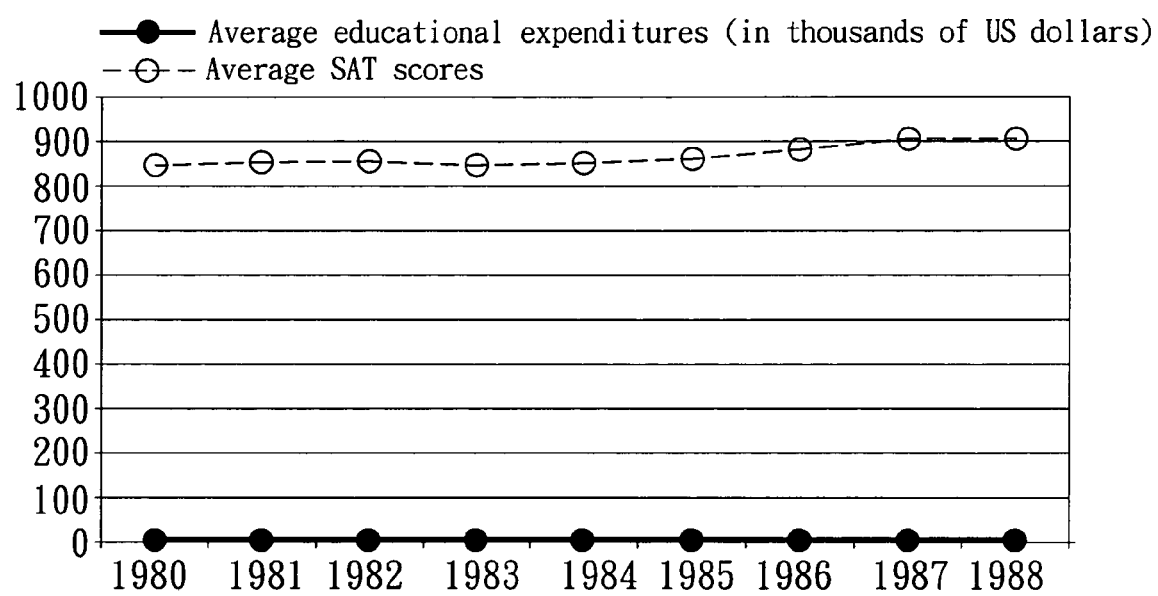
FIG. 1 is a graph of a pair of data sets presented using Microsoft Office EXCEL®.

Comparing the graph of FIG. 5 with the graph of FIG. 1, not only is it possible to clearly view the fluctuations in each of the two data sets in FIG. 5, but since the upper and lower boundaries of the two axes are chosen to result in the same E-value, any correlation that may exist between the two data sets may be accurately inferred from the graph of FIG. 5.

Figure 6:
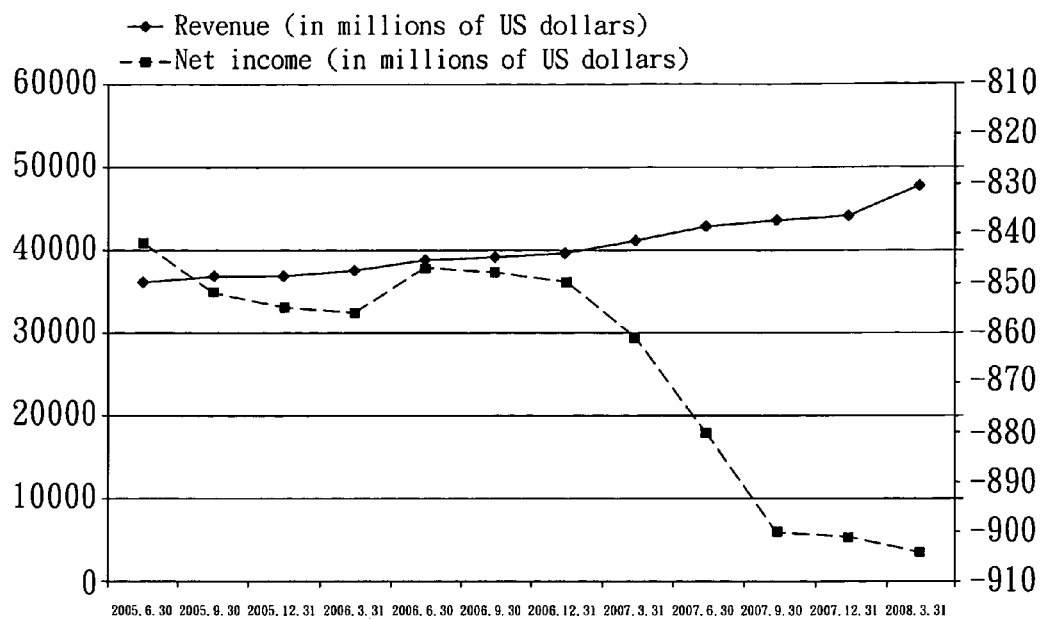
FIG. 6 is a graph of another pair of data sets presented using Microsoft Office EXCEL®.
Figure 7:
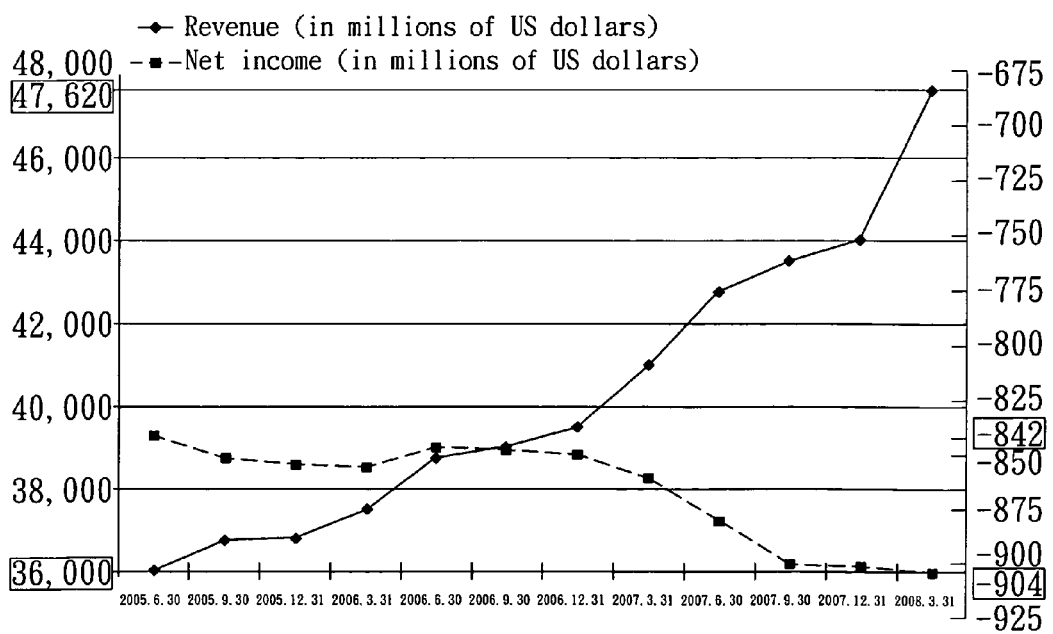
FIG. 7 is a graph similar to FIG. 6, but which is presented using the present invention.

Another example of presenting a dual-axis graph using the electronic device 100 of the present invention is provided with reference to FIGS. 6 and 7, and Table 2 of FIG. 10. Table 2 of FIG. 10 presents a pair of data sets for a hypothetical company related to revenue and net income for each quarter and over a particular time period.

When Microsoft Office EXCEL® is used to present a graph of the data sets of Table 2, the graph of FIG. 6 results. If the same data sets are presented using the electronic device 100 of the present invention, the graph appearing in FIG. 7 results.

In comparing the graph of FIG. 7 with the graph of FIG. 6, the graph of FIG. 7 more accurately depicts details that are not evident from the graph of FIG. 6. For example, at the end of the period, loss (negative net income) seems to level off, even when there are continued steep increases in revenue. Furthermore, the inverse relationship that these two data sets approximates is more clearly depicted in FIG. 7 than in FIG. 6.

Figure 8:
FIG. 8 is a graph of yet another pair of data sets presented using Microsoft Office EXCEL®.
Figure 9:
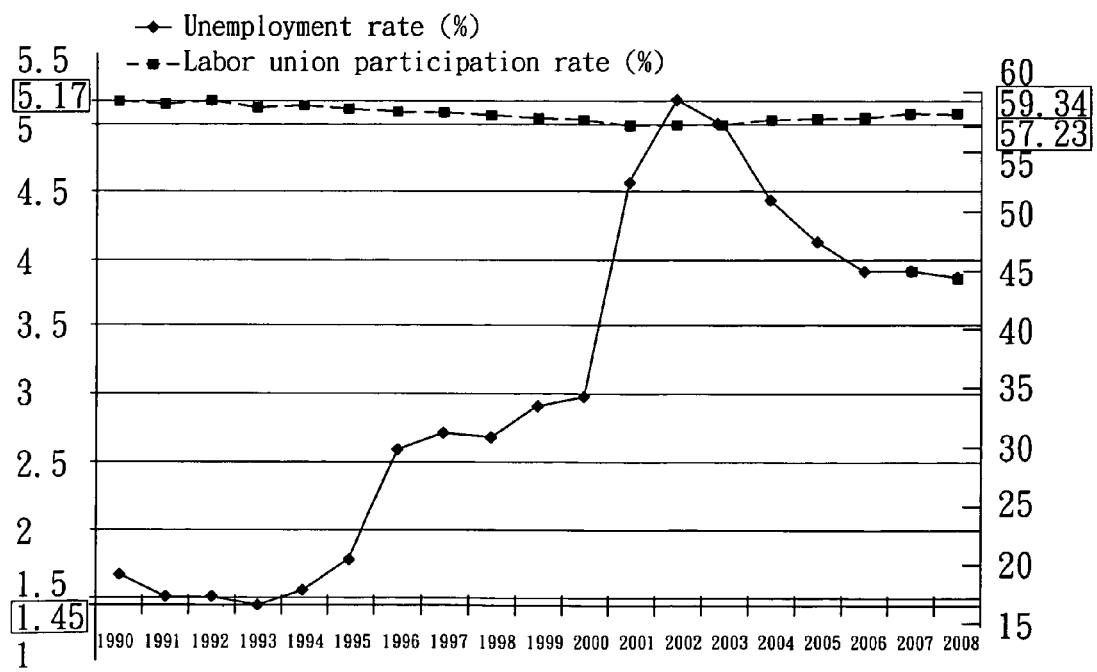
FIG. 9 is a graph similar to FIG. 8, but which is presented using the present invention.

Yet another example of presenting a dual-axis graph using the electronic device 100 of the present invention is provided with reference to FIGS. 8 and 9.

FIG. 8 shows a graph of unemployment rates and labor union participation rates for a hypothetical population over a period from 1990 to 2008 presented using Microsoft Office EXCEL®. FIG. 9 shows a similar graph to FIG. 8, but presented using the present invention.

From FIG. 8, one might inaccurately infer an inverse relationship between the two data sets for most of the period in the graph. However, as shown in FIG. 9, after the boundaries for the labor participation rates are adjusted to reflect the range of the unemployment rates in relative terms, it is evident that no real correlation can be said to exist between the two data sets, i.e., that labor participation rates for this particular population are not influenced by the unemployment rate.

In the examples provided above, the first and second coordinates of each of the data points are an ordinate and an abscissa, respectively, of a Cartesian coordinate system. However, the present invention is not limited in this regard. That is, although the first coordinates are y-coordinates (or ordinates) in the examples above, the present invention is not limited in this respect and in some embodiments, the first coordinates may be x-coordinates. For example, the graph may be presented as a horizontal bar chart, in which case the x-coordinates are the first coordinates.

Additionally, in the examples provided above, the second coordinate of each of the data points is a time coordinate, e.g., years and quarters in Tables 1 and 2 and FIGS. 5 and 7. However, the present invention is not limited in this respect and the second coordinate may be any type of ordinal coordinate (i.e., a coordinate provided in some form of order or succession), or may be names of countries, companies, etc., such as when the dual-axis graph is a bar chart.

While the present invention has been described in connection with what are considered the most practical embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A machine-implemented method for presenting a dual-axis graph for a pair of data sets, the dual-axis graph having a pair of independent and parallel first and second reference axes, and a shared axis intersecting the first and second reference axes, each of the data sets having a plurality of data points, each of the data points including a numerical first coordinate and a second coordinate, said machine-implemented method comprising:

a) reading the pair of the data sets;
b) for each of the data sets, calculating by electronic device an E-value, the E-value being a scaled function of a range of values of the first coordinates of the data points;
c) designating the data set with the larger E-value as a first data set, and the data set with the smaller E-value as a second data set;
d) setting a first boundary of the first reference axis to be equal to the first coordinate of one of the data points of the first data set having a maximum value, and a second boundary of the first reference axis to be equal to the first coordinate of one of the data points of the first data set having a minimum value;
e) setting first and second boundaries of the second reference axis by designating the first coordinate of one of the data points of the second data set having a maximum value and the first coordinate of one of the data points of the second data set having a minimum value as an initial first boundary and an initial second boundary of the second reference axis, respectively, and adjusting one of the initial first boundary and the initial second boundary of the second reference axis to thereby obtain final first and second boundaries of the second reference axis, wherein an E-value calculated based on the final first and second boundaries of the second reference axis corresponds to the E-value of the first data set; and
f) plotting on a same coordinate plane the data points of the first data set with reference to the first reference axis and the shared axis, and the data points of the second data set with reference to the second reference axis and the shared axis, wherein step e) includes one of:
e1) designating the first coordinate of said one of the data points of the second data set having the maximum value as the final first boundary of the second reference axis, and a product of the first coordinate of said one of the data points of the second data set having the maximum value and a ratio value obtained between the first coordinate of said one of the data points of the first data set having the maximum value and the first coordinate of said one of the data points of the first data set having the minimum value as the final second boundary of the second reference axis; and
e2) designating the first coordinate of said one of the data points of the second data set having the minimum value as the final second boundary of the second reference axis, and a product of the first coordinate of said one of the data points of the second data set having the minimum value and a ratio value obtained between the first coordinate of said one of the data points of the first data set having the maximum value and the first coordinate of said one of the data points of the first data set having the minimum value as the final first boundary of the second reference axis.

2. The machine-implemented method of claim 1, wherein, in step b), for each of the data sets, the E-value is calculated by subtracting the first coordinate of said one of the data points of the data set with the minimum value from the first coordinate of said one of the data points of the data set with the maximum value to thereby obtain a difference, determining which of an absolute value of the first coordinate of said one of the data points of the data set with the minimum value and an absolute value of the first coordinate of said one of the data points of the data set with the maximum value is larger, setting the larger absolute value as a multiplier, and multiplying the difference by an inverse of the multiplier.

3. The machine-implemented method of claim 1, wherein, in step b), for each of the data sets, the E-value is calculated by determining which of an absolute value of the first coordinate of said one of the data points of the data set with the minimum value and an absolute value of the first coordinate of said one of the data points of the data set with the maximum value is larger, setting the larger absolute value as a multiplier, and subtracting a product of the first coordinate of said one of the data points of the data set with the minimum value and an inverse of the multiplier from a product of the first coordinate of said one of the data points of the data set with the maximum value and the inverse of the multiplier.

4. The machine-implemented method of claim 1, wherein, when an absolute value of the first coordinate of said one of the data points of the second data set having the maximum value is not less than an absolute value of the first coordinate of said one of the data points of the second data set having the minimum value, step e1) is performed, and when the absolute value of the first coordinate of said one of the data points of the second data set having the maximum value is less than the absolute value of the first coordinate of said one of the data points of the second data set having the minimum value, step e2) is performed.

5. The machine-implemented method of claim 1, wherein, when an absolute value of the first coordinate of said one of the data points of the first data set having the maximum value is not less than an absolute value of the first coordinate of said one of the data points of the first data set having the minimum value, the ratio value is obtained by dividing the first coordinate of said one of the data points of the first data set having the minimum value by the first coordinate of said one of the data points of the first data set having the maximum value, and when the absolute value of the first coordinate of said one of the data points of the first data set having the maximum value is less than the absolute value of the first coordinate of said one of the data points of the first data set having the minimum value, the ratio value is obtained by dividing the first coordinate of said one of the data points of the first data set having the maximum value by the first coordinate of said one of the data points of the first data having the minimum value.

6. The machine-implemented method of claim 1, wherein, in step f), the data points of at least one of the first and second data sets are plotted in a line graph.

7. The machine-implemented method of claim 1, wherein, in step f), the data points of at least one of the first and second data sets are plotted in a bar chart.

8. An electronic device capable of presenting a dual-axis graph for a pair of data sets using instructions from a non-transitory computer readable medium, the dual-axis graph having a pair of independent and parallel first and second reference axes, and a shared axis intersecting the first and second reference axes, each of the data sets having a plurality of data points, each of the data points including a numerical first coordinate and a second coordinate, said electronic device comprising:

the non-transitory computer readable medium for storing the data sets;

a user interface for allowing user input of an input instruction associated with the data sets;

a reader coupled to said user interface to receive the input instruction, and reading the data sets in accordance with the input instruction;

an E-value calculating module coupled to said reader, and which, for each of the data sets, calculates an E-value, the E-value being a scaled function of a range of values of the first coordinates of the data points;

a boundary-setting module coupled to said E-value calculating module, said boundary-setting module designating the data set with the larger E-value as a first data set, and the data set with the smaller E-value as a second data set, setting a first boundary of the first reference axis to be equal to the first coordinate of one of the data points of the first data set having a maximum value, and a second boundary of the first reference axis to be equal to the first coordinate of one of the data points of the first data set having a minimum value, and setting first and second boundaries of the second reference axis by designating the first coordinate of one of the data points of the second data set having a maximum value and the first coordinate of one of the data points of the second data set having a minimum value as an initial first boundary and an initial second boundary of the second reference axis, respectively, and adjusting one of the initial first boundary and the initial second boundary of the second reference axis to thereby obtain final first and second boundaries of the second reference axis, wherein an E-value calculated based on the final first and second boundaries of the second reference axis corresponds to the E-value of the first data set; and a graph-presenting module coupled to said reader and said boundary-setting module, said graph-presenting module plotting on a same coordinate plane the data points of the first data set with reference to the first reference axis and the shared axis, and the data points of the second data set with reference to the second reference axis and the shared axis wherein said boundary-setting module performs one of the following steps:

(i) designating the first coordinate of said one of the data points of the second data set having the maximum value as the final first boundary of the second reference axis, and a product of the first coordinate of said one of the data points of the second data set having the maximum value and a ratio value obtained between the first coordinate of said one of the data points of the first data set having the maximum value and the first coordinate of said one of the data points of the first data set having the minimum value as the final second boundary of the second reference axis; and (ii) designating the first coordinate of said one of the data points of the second data set having the minimum value as the final second boundary of the second reference axis, and a product of the first coordinate of said one of the data points of the second data set having the minimum value and a ratio value obtained between the first coordinate of said one of the data points of the first data set having the maximum value and the first coordinate of said one of the data points of the first data set having the minimum value as the final first boundary of the second reference axis.

9. The electronic device of claim 8, wherein said reader is adapted to be coupled to a database that stores the data sets, and the input instruction received from said user interface causes said reader to read the data sets in said database.

10. The electronic device of claim 8, wherein, for each of the data sets, said E-value calculating module calculates the E-value by subtracting the first coordinate of said one of the data points of the data set with the minimum value from the first coordinate of said one of the data points of the data set with the maximum value to thereby obtain a difference, determining which of an absolute value of the first coordinate of said one of the data points of the data set with the minimum value and an absolute value of the first coordinate of said one of the data points of the data set with the maximum value is larger, setting the larger absolute value as a multiplier, and multiplying the difference by an inverse of the multiplier.

11. The electronic device of claim 8, wherein, for each of the data sets, said E-value calculating module calculates the E-value by determining which of an absolute value of the first coordinate of said one of the data points of the data set with the minimum value and an absolute value of the first coordinate of said one of the data points of the data set with the maximum value is larger, setting the larger absolute value as a multiplier, and subtracting a product of the first coordinate of said one of the data points of the data set with the minimum value and an inverse of the multiplier from a product of the first coordinate of said one of the data points of the data set with the maximum value and the inverse of the multiplier.

12. The electronic device of claim 8, wherein, when an absolute value of the first coordinate of said one of the data points of the second data set having the maximum value is not less than an absolute value of the first coordinate of said one of the data points of the second data set having the minimum value, said boundary-setting module performs step (i), and when the absolute value of the first coordinate of said one of the data points of the second data set having the maximum value is less than the absolute value of the first coordinate of said one of the data points of the second data set having the minimum value, said boundary-setting module performs step (ii).

13. The electronic device of claim 8, wherein, when an absolute value of the first coordinate of said one of the data points of the first data set having the maximum value is not less than an absolute value of the first coordinate of said one of the data points of the first data set having the minimum value, said boundary-setting module obtains the ratio value by dividing the first coordinate of said one of the data points of the first data set having the minimum value by the first coordinate of said one of the data points of the first data set having the maximum value, and when the absolute value of the first coordinate of said one of the data points of the first data set having the maximum value is less than the absolute value of the first coordinate of said one of the data points of the first data set having the minimum value, said boundary-setting module obtains the ratio value by dividing the first coordinate of said one of the data points of the first data set having the maximum value by the first coordinate of said one of the data points of the first data having the minimum value.

14. The electronic device of claim 8, wherein said graph-presenting module plots the data points of at least one of the first and second data sets in a line graph.

15. The electronic device of claim 8, wherein said graph-presenting module plots the data points of at least one of the first and second data sets in a bar chart.

16. A computer program product comprising a non-transitory machine-readable data storage medium including program instructions for causing an electronic device to execute consecutive steps of a machine-implemented method for presenting a dual-axis graph for a pair of data sets, the dual-axis graph having a pair of independent and parallel first and second reference axes, and a shared axis intersecting the first and second reference axes, each of the data sets having a plurality of data points, each of the data points including a numerical first coordinate and a second coordinate, said machine-implemented method comprising:
  a) reading the pair of the data sets;
  b) for each of the data sets, calculating an E-value, the E-value being a scaled function of a range of values of the first coordinates of the data points;
  c) designating the data set with the larger E-value as a first data set, and the data set with the smaller E-value as a second data set;
  d) setting a first boundary of the first reference axis to be equal to the first coordinate of one of the data points of the first data set having a maximum value, and a second boundary of the first reference axis to be equal to the first coordinate of one of the data points of the first data set having a minimum value;
  e) setting first and second boundaries of the second reference axis by designating the first coordinate of one of the data points of the second data set having a maximum value and the first coordinate of one of the data points of the second data set having a minimum value as an initial first boundary and an initial second boundary of the second reference axis, respectively, and adjusting one of the initial first boundary and the initial second boundary of the second reference axis to thereby obtain final first and second boundaries of the second reference axis, wherein an E-value calculated based on the final first and second boundaries of the second reference axis corresponds to the E-value of the first data set; and
  f) plotting on a same coordinate plane the data points of the first data set with reference to the first reference axis and the shared axis, and the data points of the second data set with reference to the second reference axis and the shared axis,
wherein step e) includes one of:
  e1) designating the first coordinate of said one of the data points of the second data set having the maximum value as the final first boundary of the second reference axis, and a product of the first coordinate of said one of the data points of the second data set having the maximum value and a ratio value obtained between the first coordinate of said one of the data points of the first data set having the maximum value and the first coordinate of said one of the data points of the first data set having the minimum value as the final second boundary of the second reference axis; and
  e2) designating the first coordinate of said one of the data points of the second data set having the minimum value as the final second boundary of the second reference axis, and a product of the first coordinate of said one of the data points of the second data set having the minimum value and a ratio value obtained between the first coordinate of said one of the data points of the first data set having the maximum value and the first coordinate of said one of the data points of the first data set having the minimum value as the final first boundary of the second reference axis.

17. The computer program product of claim 16, wherein, in step b), for each of the data sets, the E-value is calculated by subtracting the first coordinate of said one of the data points of the data set with the minimum value from the first coordinate of said one of the data points of the data set with the maximum value to thereby obtain a difference, determining which of an absolute value of the first coordinate of said one of the data points of the data set with the minimum value and an absolute value of the first coordinate of said one of the data points of the data set with the maximum value is larger, setting the larger absolute value as a multiplier, and multiplying the difference by an inverse of the multiplier.

18. The computer program product of claim 16, wherein, in step b), for each of the data sets, the E-value is calculated by determining which of an absolute value of the first coordinate of said one of the data points of the data set with the minimum value and an absolute value of the first coordinate of said one of the data points of the data set with the maximum value is larger, setting the larger absolute value as a multiplier, and subtracting a product of the first coordinate of said one of the data points of the data set with the minimum value and an inverse of the multiplier from a product of the first coordinate of said one of the data points of the data set with the maximum value and the inverse of the multiplier.

19. The computer program product of claim 16, wherein, when an absolute value of the first coordinate of said one of the data points of the second data set having the maximum value is not less than an absolute value of the first coordinate of said one of the data points of the second data set having the minimum value, step e1) is performed, and when the absolute value of the first coordinate of said one of the data points of the second data set having the maximum value is less than the absolute value of the first coordinate of said one of the data points of the second data set having the minimum value, step e2) is performed.

20. The computer program product of claim 16, wherein, when an absolute value of the first coordinate of said one of the data points of the first data set having the maximum value is not less than an absolute value of the first coordinate of said one of the data points of the first data set having the minimum value, the ratio value is obtained by dividing the first coordinate of said one of the data points of the first data set having the minimum value by the first coordinate of said one of the data points of the first data set having the maximum value, and when the absolute value of the first coordinate of said one of the data points of the first data set having the maximum value is less than the absolute value of the first coordinate of said one of the data points of the first data set having the minimum value, the ratio value is obtained by dividing the first coordinate of said one of the data points of the first data set having the maximum value by the first coordinate of said one of the data points of the first data having the minimum value.

* * * * *